US008858413B2

(12) United States Patent
Van Heck

(10) Patent No.: US 8,858,413 B2
(45) Date of Patent: Oct. 14, 2014

(54) DEVICE FOR FORMING SLEEVE-LIKE FOIL ENVELOPES FROM A FLAT STRIP OF FOIL MATERIAL

(75) Inventor: Marinus Antonius Leonarda Van Heck, Uden (NL)

(73) Assignee: Fuji Seal Europe B.V., Deurne (NL)

( * ) Notice: Subject to any disclaimer, the term of this patent is extended or adjusted under 35 U.S.C. 154(b) by 503 days.

(21) Appl. No.: 12/994,663

(22) PCT Filed: May 1, 2009

(86) PCT No.: PCT/NL2009/000109
§ 371 (c)(1),
(2), (4) Date: Jan. 18, 2011

(87) PCT Pub. No.: WO2009/145612
PCT Pub. Date: Dec. 3, 2009

(65) Prior Publication Data
US 2011/0124480 A1 May 26, 2011

(30) Foreign Application Priority Data

May 29, 2008 (NL) ...................................... 1035494

(51) Int. Cl.
*B31B 1/14* (2006.01)
*B65C 3/06* (2006.01)
*B29C 63/42* (2006.01)
*B31B 1/90* (2006.01)

(52) U.S. Cl.
CPC .............. *B29C 63/426* (2013.01); *B65C 3/065* (2013.01)
USPC ................ 493/227; 493/288; 53/399; 53/582

(58) Field of Classification Search
CPC ........ B65C 3/065; B65B 21/245; B65B 9/13; B65B 11/00; B29C 63/426
USPC ..................... 493/227, 288; 53/399, 582, 585
See application file for complete search history.

(56) References Cited

U.S. PATENT DOCUMENTS

| 4,199,851 | A | | 4/1980 | Doherty ........................... 29/235 |
| 5,737,900 | A | * | 4/1998 | Konstantin et al. ............. 53/295 |
| 6,966,164 | B2 | * | 11/2005 | Navarro et al. .................. 53/399 |
| 7,024,841 | B2 | * | 4/2006 | Kramer et al. ................... 53/585 |
| 7,156,140 | B1 | * | 1/2007 | Houatchanthara ............ 156/521 |
| 7,398,811 | B1 | * | 7/2008 | Duncan et al. ................. 156/392 |
| 8,146,334 | B2 | * | 4/2012 | Fresnel ............................ 53/585 |
| 8,613,183 | B2 | * | 12/2013 | Nyren .............................. 53/585 |

FOREIGN PATENT DOCUMENTS

GB 2142900 1/1985

\* cited by examiner

*Primary Examiner* — Hemant M Desai
(74) *Attorney, Agent, or Firm* — Roberts & Roberts, LLP

(57) ABSTRACT

The invention relates to a device for forming sleeve-like foil envelopes from a flat strip of foil material (12), at least comprising supply means (10) for supplying the flat strip of foil material; cutting means (20) for cutting the strip of foil material through over the entire width thereof so as to obtain a foil envelope strip of a specific length having a first and a second free edge (120a, 120b); at least one enveloping unit, around which the foil envelope strip is to be wrapped; joining means disposed near said enveloping unit for joining said first and said second free edge together, so as to obtain a sleeve-like foil envelope; as well as discharge means for discharging the sleeve-like foil envelope thus formed from the enveloping unit.

18 Claims, 5 Drawing Sheets

DEVICE FOR FORMING SLEEVE-LIKE FOIL ENVELOPES FROM A FLAT STRIP OF FOIL MATERIAL

This patent application is a U.S. National Phase of International Patent Application No. PCT/NL09/00109, filed May 1, 2009, which claims priority from Netherlands Patent Application No. 1035494, filed May 29, 2008, the disclosures of which are incorporated herein by reference in their entirety.

BACKGROUND OF THE INVENTION

1. Field of the Invention

The invention relates to a device for forming sleeve-like foil envelopes from a flat strip of foil material, at least comprising supply means for supplying the flat strip of foil material; cutting means for cutting the strip of foil material through over the entire width thereof so as to obtain a foil envelope strip of a specific length having a first and a second free edge; at least one enveloping unit, around which the foil envelope strip is to be wrapped; joining means disposed near said enveloping unit for joining said first and said second free edge together, using heat, so as to obtain a sleeve-like foil envelope; as well as discharge means for discharging the sleeve-like foil envelope thus formed from the enveloping unit.

Such a device is quite common, it is used for forming sleeve-like foil envelopes, which, after being formed, can be placed from the enveloping unit over an object with some oversize. The foil material is made of a so-called shrink material, which shrinks as a result of heat being applied and which forms with a close fit to the shape of the bottle or container around which the sleeve-like envelope has been arranged.

To obtain a sleeve-like foil envelope, a strip of foil material is supplied from a stock thereof to a cutting unit, where the strip of foil material is cut to the desired length. The individual foil envelope strips thus obtained are each separately wrapped around an enveloping unit, whereupon the two edges are joined together by joining means (also called sealing means), using heat, so as to form a cover.

The sleeve-like foil envelope thus realised is subsequently removed from the enveloping unit and placed over a bottle or container with a certain (slight) oversize. The foil material is made of a so-called shrink material, and when the bottle or container with the surrounding foil envelope is passed through a heating channel, the oversize sleeve-like foil envelope will shrink and close around the bottle or container with a close fit.

2. Description of the Related Art

A drawback of the known devices is that they are only suitable for processing thick or stiff foil materials if a high processing rate is to be realised. When thinner or more flexible foil materials are used, the processing rate must be reduced in order to prevent undesirable jamming of the device. The device will become clogged and jam in such situations, which is undesirable.

SUMMARY OF THE INVENTION

The object of the invention is to provide a device as referred to in the introduction, which makes it possible to process thin, flexible foil materials as well, without the device becoming clogged and/or jamming. According to the invention, the supply means to that end have a curved surface, over which the flat strip of foil material is to be passed.

The strip of foil material is thus given a curved cross-section while being transported to the cutting means and the enveloping unit, resulting in additional stiffness, thereby preventing jamming of the device due to clogging of the thin foil material.

In a functional embodiment, the cutting means are movable in the curved plane of the supply means. This makes it possible to form individual foil envelope strips simultaneously while supplying the strip of foil material, resulting in a significantly increased speed and capacity of the enveloping device according to the invention.

More specifically, the cutting means comprise at least one cutting element.

According to the invention, in order to realise a straight cutting line in the foil material being moved over the curved surface, the at least one cutting element makes an angle with the longitudinal direction of the supply means.

In one embodiment according to the invention, the cutting element is more functionally configured as a rotary, disc-shaped cutting element.

According to a specific embodiment, in order to cut the foil material in an effective manner, the cutting element mates with a cutting roller to be placed in abutment with the cutting element.

An effective construction requiring little installation space can be realised in that according to the invention the supply means are cylindrical in shape.

An additional gain as regards installation space is realised in that according to the invention the cutting means are disposed within the cylindrical supply means.

According to a specific aspect of the device according to the invention, the cutting means comprise a rotatable cylindrical ring, which cylindrical ring is concentrically disposed relative to the cylindrical supply means. Thus, the foil strip being supplied can be cut to the desired length in one operation by the cutting means so as to obtain individual foil envelope strips.

To realise an effective transportation of the foil envelope strip in the direction of the cutting means, the supply means may comprise at least one drivable conveying roller to be supported on said curved surface, between which the flat strip of foil material can be passed.

To realise an effective transportation of the foil envelope strip in the direction of the enveloping unit, the supply means may comprise at least one drivable further conveying roller at the location of the cutting means for carrying the individual foil envelope strip to said at least one enveloping unit.

According to another special embodiment of the device, in order to further prevent or avoid jamming and standstill of the device, the supply means may comprise guide means at the location of said cutting means for guiding the individual foil envelope strip to said at least one enveloping unit.

In a specific embodiment, said guide means comprise two parallel, spaced-apart guide plates. Between said guide plates, the foil envelope strip can be passed (retained) so as to realise a smooth transfer, without any jamming, to the enveloping unit.

More functionally, in order to realise an improved guidance of the foil envelope strip, the guide means may comprise at least one spray nozzle for a medium under pressure, which spray nozzle is directed in the conveying direction of the foil envelope strip.

In another specific embodiment, said at least one spray nozzle is provided in at least one of said guide plates.

BRIEF DESCRIPTION OF THE DRAWINGS

The invention will now be explained in more detail with reference to a drawing, in which:

For a better understanding of the invention, like parts will be indicated by identical numerals in the description of the figures below.

FIG. 1 and FIG. 2a show in top plan view and in side view, respectively, an embodiment of the device according to the invention indicated at 1.

DETAILED DESCRIPTION OF THE INVENTION

Figure 1:
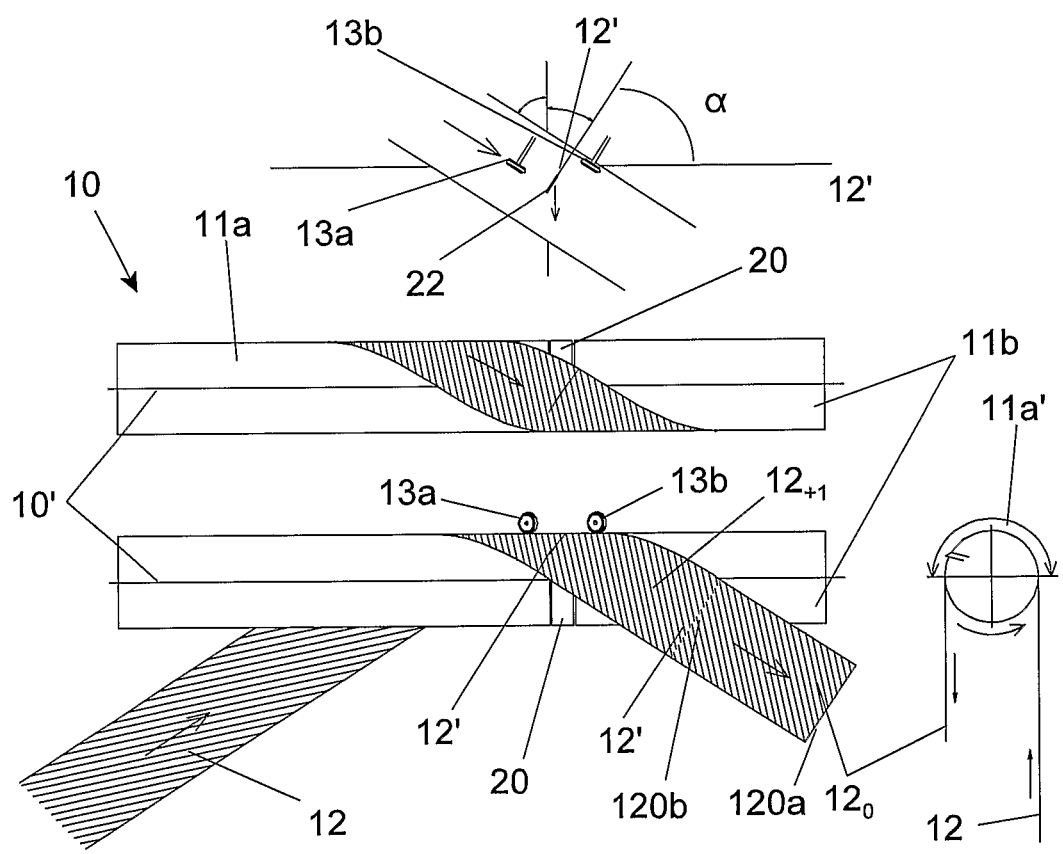
FIG. 1 shows an embodiment of a device according to the invention.

The device for forming sleeve-like foil envelopes $12_{-2}$-$12_{-1}$-$12_{0}$-$12_{+1}$-etc from a flat strip of foil material 12 is made up of a carousel of several enveloping units 30a-30b-30c-etc-30l, which is rotatable about an axis 40, around each of which enveloping units 30a-30b-30c-etc-30l a free foil envelope strip $12_{-2}$-$12_{-1}$-$12_{0}$-$12_{+1}$-etc obtained from the strip of foil material 12 is to be arranged.

Each individual foil envelope strip has a specific length, depending on the product to be enveloped (a bottle or a container) and is provided with a first and a second free edge 120a, 120b, respectively. Each enveloping unit 30a-30b-30c-etc-30l around which the foil envelope strip is to be placed is made up of a body 30a-30b-30c-etc-30l, which is rotatably driven about an axis 31. The rotation about the axis 31 of each enveloping unit 30a-30b-30c-etc-30l takes place by drive means (not shown), which are assumed to be generally known.

To supply an individually obtained foil envelope strip $12_0$-etc to each enveloping unit 30a-etc, supply means 10 are provided for carrying the flat strip of foil material 12 towards cutting means 20.

According to the invention, the supply means 10 have a curved surface 11a, as shown in FIG. 1, over which the flat strip of foil material can be passed. As a result of the curved surface 11a, over which the flat strip of foil material 12 is passed, the strip of foil material 12 is given a curved cross-section upon being transported in the direction of the cutting means 20 and the respective enveloping unit 30a-30b-30c-etc, resulting in additional internal stiffness. Thus, undesirable jamming of the device, for example due to clogging of the thin foil material 12, is prevented.

In this way it is possible not only to process thinner flexible foil materials, but also to operate the device at a higher speed.

Figure 3:
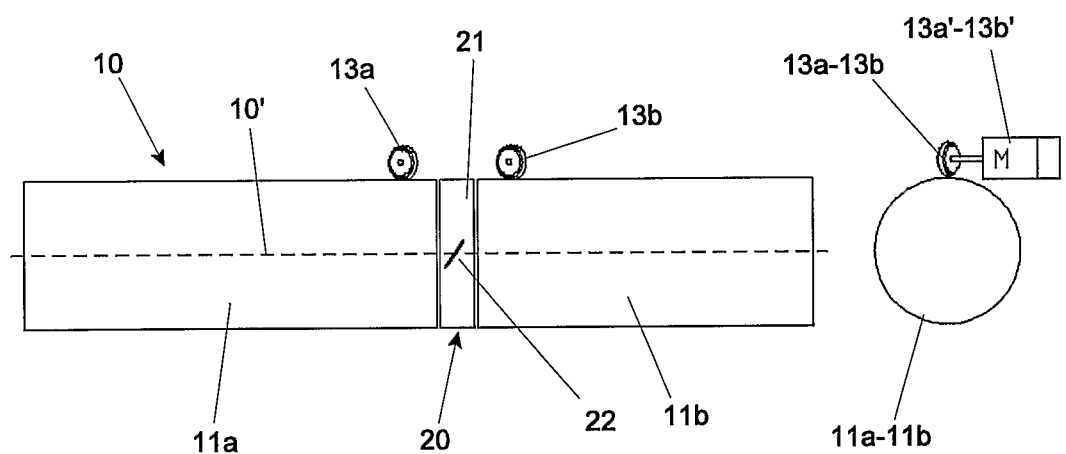
Figure 4:
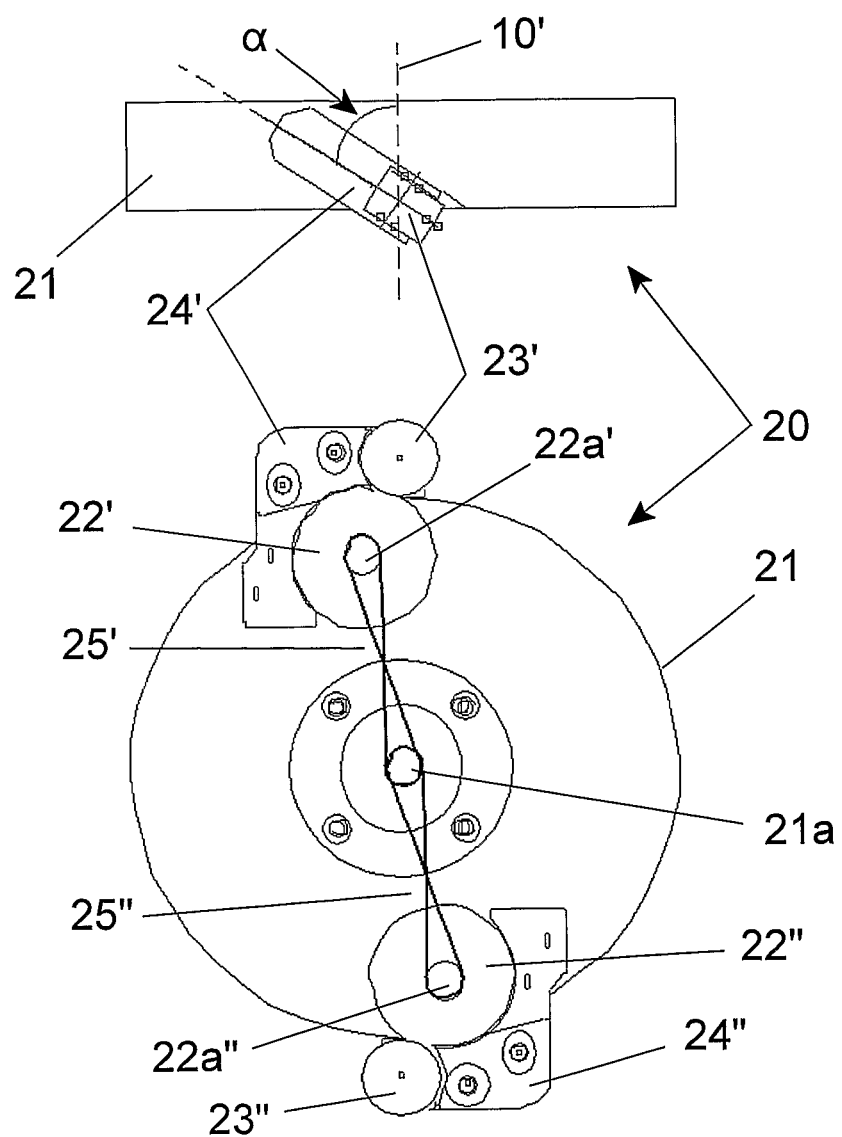

As is clearly shown in FIGS. 1, 3 and 4, the cutting means 20 are according to the invention movable in the curved plane 11a of the supply means 10.

The supply means 10 are configured as a cylindrical tube having a longitudinal axis 10', which is oriented at a specific angle relative to the longitudinal axis of each enveloping unit 30a-30b-30c-etc and the axis of rotation 40 of the enveloping carrousel. More in particular, and as shown in FIGS. 3 and 4, the cutting means 20 are disposed within the cylindrical tube of the supply means 10 and made up of a cylindrical ring 21, which is arranged concentrically with the cylindrical tube 10.

According to the invention, the cutting means 20 comprise at least one cutting element 22, more in particular two cutting elements 22'-22", as is clearly shown in FIG. 4. The cutting element 22 (or the cutting elements 22'-22") are arranged in such a manner within the cutting means 20 that the cutting blades extend just outside the circumferential surface of the cylindrical ring 21.

Since the rotatable cylindrical cutting ring 21 is arranged concentrically with the cylindrical supply means 10, the supply means 10 are composed of two cylindrical tube elements 11a-11b. The cylindrical tube element 11a functions as a cylindrical supply tube, whilst the cylindrical tube element 11b functions as a cylindrical discharge tube for discharging individually realised foil envelope strips in the direction of the respective enveloping unit.

During operation, supply means 13a-13b move the flat strip of foil material 12 over the curved surface of the cylindrical tube 10 in the direction of the cutting means 20.

Supply means for supplying the flat strip of foil material 12 are made up of at least one drivable conveying roller 13a, which, as is clearly shown in FIG. 5, can be rotatably driven by a driving motor 13a' as known per se. Likewise, the supply means comprise at least one drivable further conveying roller 13b for supplying the individually obtained foil envelope strip $12_{-2}$-$12_{-1}$-$12_{0}$-$12_{+1}$-etc. Said further conveying roller 13b can also be rotatably driven in a suitable manner by a driving motor 13'.

The supply means 13a-13b are configured as a drivable conveying roller to be supported on the curved surface 11a, which thus carries along the flat strip of foil material 12 over the curved surface 11a in the direction of the cutting means 20.

More in particular, the drivable conveying roller 13a functions to carry the flat strip of foil material 12 over the curved surface 11a in the direction of the cutting means 20. The further driving roller 13b functions to carry the individual envelope strip $12_0$-$12_{-1}$-$12_{-2}$-etc realised by the cutting means 20 to the respective enveloping unit 30a-30b-30c-etc-.

As already said before, the cutting means 20 are made up of a rotatable cylindrical ring 21 and one or more cutting elements 22 (22'-22") of the cutting blade, which extends just outside the circumferential surface of the cylindrical ring 21 (see FIG. 4). As is clearly shown in FIG. 1, the flat strip of foil material 12 is passed over the curved surface 11a of the cylindrical supply tube 10, being oriented at an angle thereto. To obtain individual foil envelope strips $12_0$-etc, the cutting elements 22 (22'-22") must thus also be disposed at an angle $\alpha$ to the longitudinal direction 10' of the cylindrical supply tube. Said angle $\alpha$ is clearly shown in FIG. 1.

To obtain individual foil envelope strips $12_0$-etc, the cutting element 22 must be moved in the curved plane 11a of the cylindrical supply tube 10 at such a speed that a straight (right-angled) cutting edge is realised in the flat strip of foil material 12.

This requires a precise adjustment of the supply rate of the flat strip of foil material 12 over the curved surface 11a (realised by the driving roller 13a of the supply means) and the rotational speed of the cutting blade 22 in the curved plane 11a.

The cutting element 22 (22'-22") is to that end (see FIG. 4) rotatably mounted in a (likewise rotatable) cylindrical ring 21, which ring 21 is disposed concentrically with the cylindrical supply tube 10 (see FIG. 3). The cylindrical ring is thus rotatable about its axis 21a, which is concentrical with and coincides with the longitudinal axis 10' of the cylindrical supply tube 10. The cutting elements 22'-22", which are movable in the circumferential playing of the curved surface 11a, are likewise rotatable about their axis 22a'-22a". Two endless driving belts 25'-25" are to that end passed over the shafts 21a-22a'-22a", which driving belts impart a rotation about the shafts 22a'-22a" synchronised with the rotational speed of the cylindrical ring 21 (about the shaft 21a).

Because of the rotation of the cylindrical ring 21, the cutting elements 22'-22" will come into contact with the flat strip of foil material 12 being supplied over the curved surface 11a of the cylindrical supply tube with every revolution. In order to be able to adequately cut said flat strip of foil material 12, each cutting element 22'-22" coacts with a cutting roller 23'-23" to be placed into abutment with the cutting element 22'-22". Said cutting rollers 23'-23" are connected to the rotatable cylindrical ring 21 by means of a connecting yoke 24'-24". The two cutting rollers 23'-23" thus rotate jointly with the corresponding cutting elements 22'-22" and will form two separate right-angled cutting edges 12' in the flat strip of foil material with every full revolution of the cylindrical ring 21.

Since the first driving roller 13a supplies the flat strip of foil material at a constant speed over the curved surface 11a of the cylindrical supply tube 10 in the direction of the cutting means 20, each cutting element 22'-22" will form a cutting edge 12' in the foil material 12 with every full revolution of the cylindrical cutting ring 21.

Thus, individual foil envelope strips $12_0$-$12_{+1}$-$12_{+2}$-etc are obtained, which strips are carried towards an enveloping unit 30a-30b-30c-etc by means of said further conveying roller 13b.

By gearing the speed at which the strip of foil material 12 is supplied (by the conveying roller 13a), the rotational speed of the cylindrical cutting ring 21 and the angle relative to the longitudinal axis 10' at which the flat strip of foil material 12 is supplied over the curved surface 11a to each other, it becomes possible to control the length of each individually obtained foil envelope strip $12_0$-etc.

The curved shape of the circumferential surface 11a of the cylindrical supply tube 10 sets up a certain pre-tension in the flat strip of foil material 12. The amount of pre-stress in the individually obtained foil envelope strips $12_0$-etc is smaller, however, so that there is still a risk of the device becoming clogged and jamming at the location of the enveloping unit 13a-etc, especially when very thin and flexible foil materials are used.

In order to prevent an individual foil envelope strip $12_0$ from clogging upon being moved in the direction of the enveloping unit 30a by the further conveying roller, another embodiment of the invention is provided with guide means 50. Said guide means 50 provide a smooth guidance of the individual foil envelope strips $12_0$-$12_{+1}$-$12_{+2}$-etc to the respective enveloping unit 30a-etc.

Figure 2A:
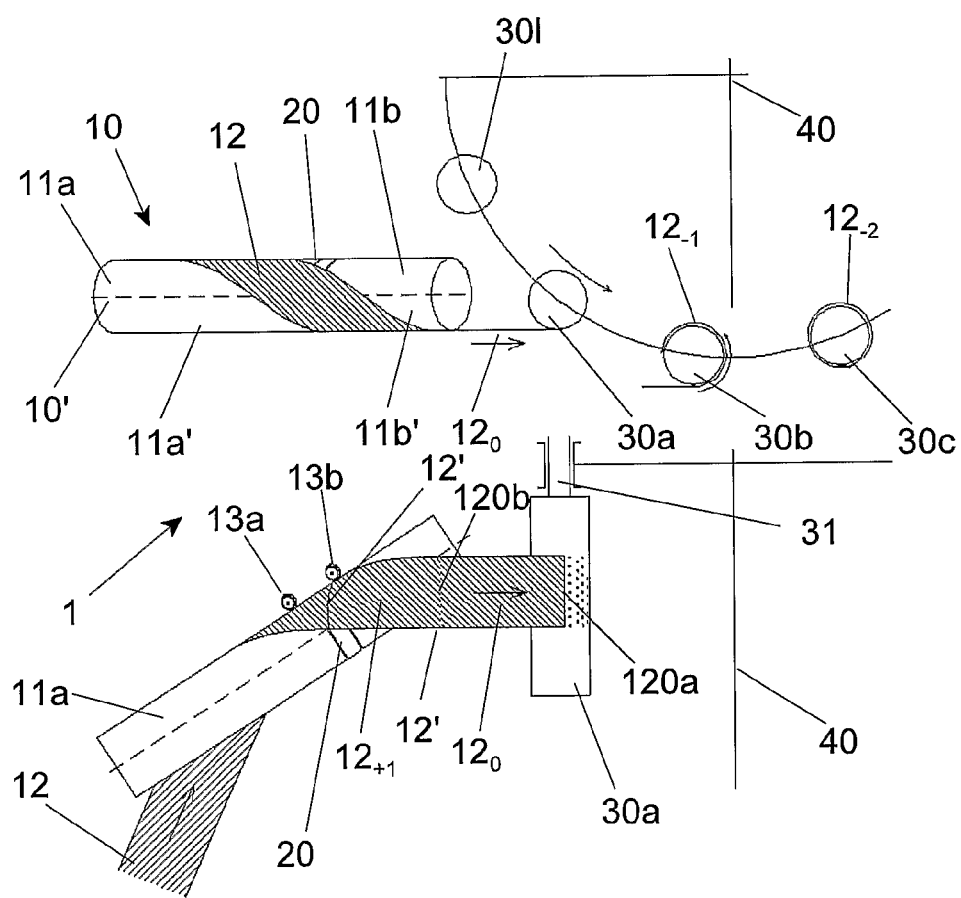
FIGS. 2a-2b-3-4 show various embodiments of a device according to the invention.
Figure 2B:
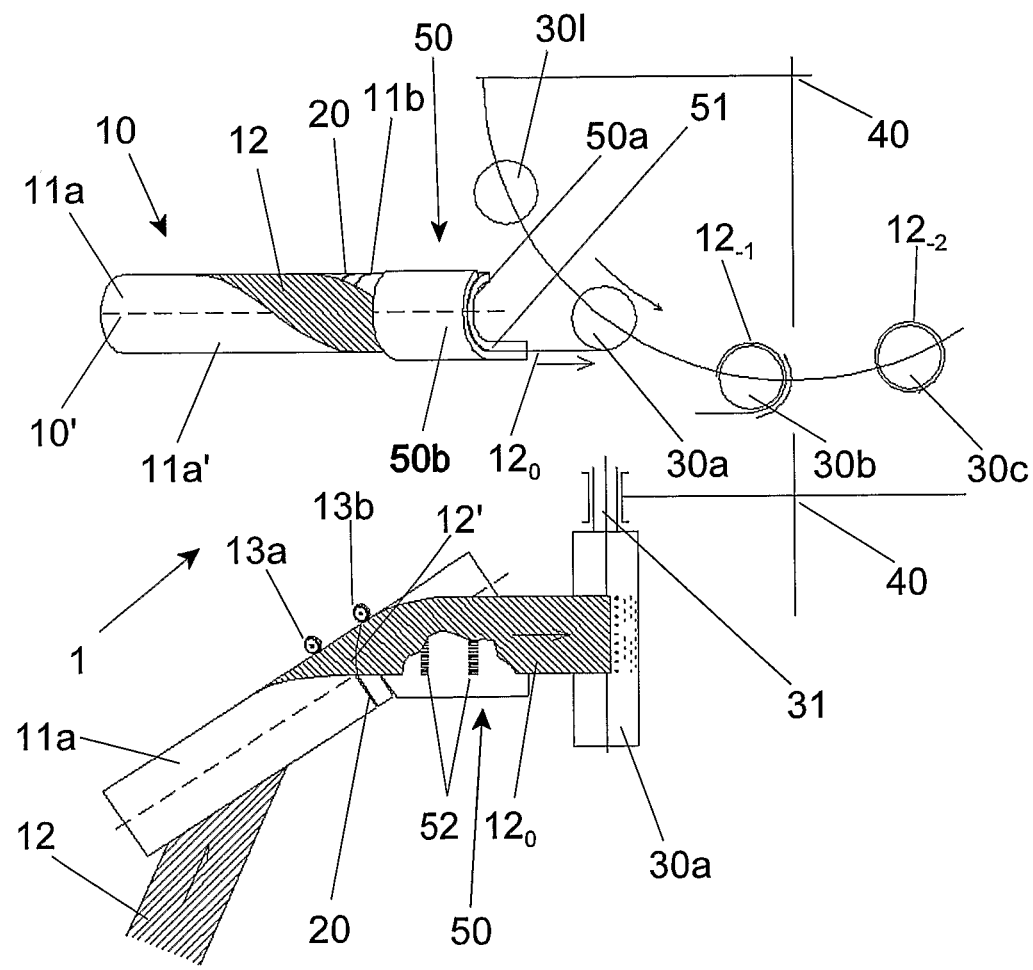

As shown in FIG. 2b, the guide means 50 comprise two parallel, spaced-apart guide blades 50a-50b, between which the individually obtained foil envelope strips $12_0$-etc can be guided towards the enveloping unit.

In order to further support the movement of each individual foil envelope strip $12_0$-etc towards the enveloping unit (this in order to prevent the device from jamming due to possible clogging of the thin flexible foil material), the guide means 50 may also comprise at least one spray nozzle 52, by means of which the medium under pressure can be directed in the conveying direction of the foil envelope strips $12_0$-etc. This, too, helps to realise a more controllable and controlled movement of each individual foil envelope strip $12_0$-etc in the direction of the respective enveloping unit.

More in particular, the spray nozzle is 52 may be provided in at least one of the guide blades 50a-50b of the guide means.

It will be understood that it is possible to form large numbers of foil envelope strips at a high processing rate from a flat strip of foil material 12 to be supplied when using the device according to the invention. The curved surface 11a creates a certain pre-stress in the curved foil material 12, whilst the cutting means 20, which are movable in the curved plane of the supply means 10, make it possible to form several individual foil envelope strips having a precisely adjustable length in a quick and constant manner.

Although this is not shown in the drawings and not relevant to the invention, each enveloping unit 30a-30b-30c-etc is provided with joining means for joining together the free edges 120a-120b of each foil envelope strip wrapped around the respective enveloping unit, for example by means of heat. By fusing the two free edges of each foil envelope strip together by means of heat, a cover-like foil envelope is realise, which can subsequently be discharged from each enveloping unit by discharge means (likewise not shown) and be placed over a container or bottle.

What is claimed is:

1. A device for forming sleeve-like foil envelopes from a flat strip of foil material, comprising:
   supply means for supplying the flat strip of foil material; cutting means for cutting the flat strip of foil material through over an entire width thereof so as to obtain a foil envelope strip of a specific length having a first and a second free edge; at least one enveloping unit, around which the foil envelope strip is to be wrapped; connecting means for joining said first and said second free edge together, so as to obtain a sleeve-like foil envelope; and discharge means for discharging the sleeve-like foil envelope thus formed from the enveloping unit, wherein said supply means comprise a cylindrical supply tube having a curved surface, over which the flat strip of foil material is to be passed, wherein the direction of travel of said flat strip of foil material is oriented at an oblique angle relative to the axial direction of the longitudinal axis of the cylindrical supply tube such that, when the strip of foil material is fed over said curved surface, the strip of foil material is given a curved cross-section in a direction transverse to its length, and wherein the supply means further comprises at least one drivable conveying roller to be supported on said curved surface, which roller is capable of feeding the strip of foil material over the curved surface at said oblique angle.

2. The device according to claim 1, characterised in that said cutting means are movable in the curved plane of the supply means.

3. The device according to claim 2, wherein said cutting means comprise at least one cutting element.

4. The device according to claim 3, wherein said at least one cutting element makes an angle with the longitudinal direction of said supply means.

5. The device according to claim 4 wherein said cutting element is configured as a rotary cutting element.

6. The device according to claim 4 wherein said cutting element mates with a cutting roller to be placed in abutment with the cutting element.

7. The device according to claim 3 wherein said cutting element is configured as a rotary cutting element.

8. The device according to claim 7 wherein said cutting element mates with a cutting roller to be placed in abutment with the cutting element.

9. The device according to claim 3 wherein said cutting element mates with a cutting roller to be placed in abutment with the cutting element.

10. The device according to claim 2 wherein said cutting element mates with a cutting roller to be placed in abutment with the cutting element.

11. The device according to claim 1 wherein said cutting element mates with a cutting roller to be placed in abutment with the cutting element.

12. The device according to claim 1, wherein said cutting means are disposed within the cylindrical supply tube.

13. The device according to claim 12 wherein said cutting means comprise a rotatable cylindrical ring, which cylindrical ring is concentrically disposed relative to the cylindrical supply tube.

14. The device according to claim 1 wherein said supply means comprise at least one drivable further conveying roller at the location of the cutting means for carrying the individual foil envelope strip to said at least one enveloping unit.

15. The device according to claim 1 wherein said supply means comprise guide means at the location of said cutting means for guiding the individual foil envelope strip to said at least one enveloping unit.

16. The device according to claim 15, wherein said guide means comprise two parallel, spaced-apart guide plates.

17. The device according to claim 16 wherein said at least one spray nozzle is provided in at least one of said guide plates.

18. The device according to claim 15 wherein said guide means comprise at least one spray nozzle for a medium under pressure, which spray nozzle is directed in the same direction as the conveying direction of the foil envelope strip.

* * * * *